3,657,368
Patented Apr. 18, 1972

3,657,368
CATALYSIS BY DISPERSIONS OF METAL HALIDES IN MOLTEN TRIHALOSTANNATE(II) AND TRIHALOGERMANATE(II) SALTS
George W. Parshall, Wilmington, Del., assignor to E. I. du Pont de Nemours and Company, Wilmington, Del.
No Drawing. Division and a continuation-in-part of application Ser. No. 727,710, May 8, 1968. Divided and this application Nov. 24, 1970, Ser. No. 92,541
Int. Cl. C07c 5/14, 5/16
U.S. Cl. 260—666 A                10 Claims

ABSTRACT OF THE DISCLOSURE

Dispersions of transition and other metal halides in molten tetrahydrocarbylammonium or phosphonium trihalostannate(II) and trihalogermanate(II) salts are useful as catalysts for the hydrogenation, isomerization or carbonylation of olefins and the hydrogenation of nitriles.

RELATED APPLICATION

This application is a division and continuation-in-part of my copending application, Ser. No. 727,710, filed May 8, 1968, and now U.S. Pat. 3,565,823 issued Feb. 23, 1971.

BACKGROUND OF THE INVENTION

(A) Field of the invention

This invention relates to the use of the dispersions of metal halides in molten quaternary ammonium trihalostannate(II) or trihalogermanate(II) salts of my above-mentioned application as catalysts in processes for hydrogenating, isomerizing and carbonylating olefins and for hydrogenating nitriles.

(B) Description of the prior art

The following references are of interest in connection with the invention of this application:

(1) R. D. Cramer et al., J. Am. Chem. Soc., 85, 1691 (1963). Solutions of chloroplatinic acid and stannous chloride are effective catalysts for the hydrogenation of olefins.

(2) G. C. Bond et al., J. Catal., 7, 217 (1967). Solutions of chloroplatinic acid and stannous chloride are effective catalysts for the isomerization of 1-pentene to its equilibrium mixture with 2-pentenes.

(3) H. van Bekkum et al., J. Catal., 7, 292 (1967). Solutions of chloroplatinic acid and stannous chloride catalyze the hydrogenation of cyclohexene and the selective hydrogenation of dienes to monoenes.

(4) L. P. van't Hoff et al., J. Catal., 7, 295 (1967). Solutions of chloroplatinic acid and stannous chloride are used as catalysts for the hydrogenation of soybean oil. Methyl linoleate gives predominantly methyl oleate.

(5) E. L. Jenner et al., U.S. Pat. 2,876,254 (1959). The carboxymethylation of propylene gives a product mixture containing approximately equal amounts of methyl butyrate and methyl isobutyrate.

(6) F. N. Jones, J. Org. Chem., 32, 1667 (1967) and U.S. Pat. 3,397,252 (1968). Inter alia, vinyl chloride is reductively coupled to yield butadiene by Sn(II) in solutions containing catalytic amounts of $PtCl_2$, cesium fluoride acting as cocatalyst.

The following art may also be of interest:

(7) Th. Kruck et al., Angew Chem. internat. Edit., 8, 679 (1969). The reaction of trichlorostannate salts with metal carbonyls is used to produce complexes containing the $SnCl_3$ ligand. Tetraethylammonium trichlorostannate is used in one experiment although not above its melting point.

(8) Japanese Pat. 7,005,255 (1970). Aliphatic polyolefins will hydrogenate to monoolefins with the catalyst $HPtSnCl_3(PR_3)$.

(9) W. Wilkinson, U.S. Pat. 3,501,531 (1970). Complexes prepared from mixtures of rhodium chloride and stannous chloride are used as catalysts for the hydroformylation of olefins.

(10) R. W. Adams et al., Inorg. Nucl. Chem. Letters, 4, 455 (1968). A mixture of dichlorobis(triphenylphosphine)platinum and stannous chloride is effective as a catalyst for the hydrogenation of terminal olefins and for the hydrogenation and isomerization of dienes.

(11) L. J. Kehoe et al., J. Org. Chem., 35, 2846 (1970). Solutions of chloroplatinic acid and $SnCl_2$ in ketones or ethers are used to catalyze the carbonylation of terminal olefins to alkyl esters.

SUMMARY OF THE INVENTION

This invention is directed to processes employing as catalysts the liquid dispersions of my above-identified copending application. These dispersions, which include molecular dispersions, consist essentially of: (A) at least 0.05 weight percent of a chloride-, bromide- or iodide-containing salt of a metal having an atomic number of 22–28, 40–46 or 72–79; and (B) a molten salt of a compound of the formula $[R^1R^2R^3R^4Q]YX_3$ wherein $R^1$, $R^2$, $R^3$ and $R^4$, independently, contain up to 18 carbons and are alkyl, cycloalkyl, aryl, alkaryl or aralkyl; or $R^1$ and $R^2$, conjointly, contain 4 to 6 carbons and is alkylene; or $R^1$, $R^2$, $R^3$ and Q conjointly is pyridinium or quinolinium; Q is nitrogen or phosphorus; Y is tin or germanium; and X is chlorine or bromine.

The dispersions can be made, for example, by mixing component A and B at a temperature above the melting point of component B, as is fully disclosed in my copending application. Dispersions formed and claimed in the copending application include the following:

N,N,N,N - tetraethylammonium trichlorostannate(II) containing: $PtCl_2$; $PdCl_2$; $RuCl_3$ hydrate; $RhCl_3$ hydrate; $IrCl_3 \cdot 4H_2O$; $OsCl_3$; $ReCl_3$; $CoCl_2$; $CoCl_2 \cdot 6H_2O$;

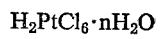

$FeCl_2$; $FeCl_3$; $MnCl_2$; $CrCl_2$; $CrCl_3$; $VCl_3$; $TiCl_3$; $NiCl_2$; $NiBr_2$; $NiI_2 \cdot 6H_2O$; $IrBr_3$; $K_2PtCl_4$; $K_2PdCl_4$; $WCl_6$; $MoCl_5$; $(Et_3P)_2PtCl_2$ (Et is ethyl); $(NO)RuCl_3 \cdot 3H_2O$; $AuCl_3$; and N,N,N,N-tetraethylammonium trichlorogermanate(II) containing: $NiBr_2 \cdot 6H_2O$; $CoCl_2$; $PdCl_2$; $RuCl_2 \cdot 3H_2O$; $RhCl_3 \cdot H_2O$; etc.

In the present invention, all the above-mentioned dispersions serve as catalysts in:

(A) A process for the hydrogenation of olefins and nitriles and for the isomerization of olefins; and (B) A process for the carbonylation of olefins.

(A) Hydrogenation and isomerization

The process for the hydrogenation of olefins or nitriles is conducted by heating a mixture of hydrogen and an olefin, including a cycloolefin, or a nitrile in the presence of a catalytically effective amount of at least one of the above-noted metal halide-trihalostannate(II) or -trihalogermanate(II) dispersions at a temperature of at least the melting point temperature of said dispersion.

Any olefin can be hydrogenated according to the invention, but the reaction may be expressed more particularly by the equation which follows (Δ signifies that the temperature is high enough to keep the catalyst molten):

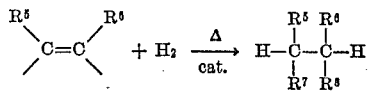

wherein $R^5$, $R^6$, $R^7$ and $R^8$, individually, are hydrogen, alkyl of up to 12 carbons, alkenyl of up to 12 carbons, aryl of up to 10 carbons, aralkyl of up to 10 carbons, alkaryl of up to 10 carbons, aralkenyl of up to 10 carbons, alkoxycarbonylalkyl of up to 14 carbons, alkoxycarbonylalkylene of up to 14 carbons, —$COOR^9$ or —$COR^9$ where $R^9$ is lower alkyl; or $R^5$ and $R^7$ conjointly is alkylene or alkenylene of 4 to 6 carbons; or $R^5$ and $R^6$ is alkylene or alkenylene of up to 10 carbons or the divalent radical of the formula:

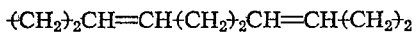

with the proviso that at least two of $R^5$, $R^6$, $R^7$ and $R^8$ are hydrogen. Included within the definition of the olefin are 1,5-cyclooctadiene, 1,5-cyclododecadiene and 1,5,9-cyclododecatriene.

In the hydrogenation of olefins, as in all the processes of the invention, an effective catalytic amount of the dispersions of my above-mentioned application or mixtures thereof is used. In general, an effective catalytic amount will be dependent upon the conditions, the reactants, the particular process and metal halide dispersion. Preferably, 0.005 to 10 weight percent of the metal halide in the dispersion based on the olefin reactant is used. Most preferably, 0.5 to 5 weight percent of the metal halide in the dispersion is used.

The rates of reaction of the processes are dependent upon the temperature and the reactants used. In general, the temperature of reaction will be as low as about 10° C. and up to 350° C.

Pressure reactors may be necessary for the processes to effect reaction. In general, the pressure will be autogenous pressures to 1500 atmospheres or higher.

The time of the reaction will vary from a very short time of a few minutes or less to a few hours or longer. Shorter reaction times are preferred since they give more economical processes.

Concomitant with the present hydrogenation of the olefins occurs an isomerization of starting material or product. The isomerization may, in fact, occur at such a low hydrogen concentration that no hydrogenation takes place, but a small (catalytic) amount of hydrogen is believed always to be present. Conditions are otherwise the same as for the hydrogenation. The isomerization of the olefins is of two types: (1) isomerization of a cis isomer to the trans isomer or vice versa; and (2) position isomerization such as isomerization of the olefin to a different structure. An example of the latter type of isomerization is the conversion of an α-pinene to α-terpinene, dipentene or γ-terpinene.

The process of hydrogenation of nitriles, except for the nitrile reactant, employs essentially the conditions of the hydrogenation of olefins, and may be expressed by the equation:

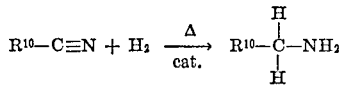

wherein $R^{10}$ may be saturated alkyl, saturated cycloalkyl, aryl, alkaryl, aralkyl and aralkaryl, each of up to 18 carbons, and nitrile mono-substituted derivatives of these.

(B) Carbonylation

The process for the carbonylation of an olefin includes hydroformylation, carboxylation and alkoxycarbonylation and consists in reacting the olefin with carbon monoxide and an active-hydrogen-containing composition of the group consisting of hydrogen, water and alcohols. Except for the reactants, all three of these reactions employ essentially the conditions of the hydrogenations noted above.

Hydroformylation is conducted by heating a mixture of carbon monoxide, hydrogen and any olefin in the presence of a catalytically effective amount of at least one of the metal halide-trihalostannate(II) or -trihalogermanate(II) dispersions at a temperature of at least the melting point temperature of said dispersion. The process of hydroformylation may be particularly expressed by the equation:

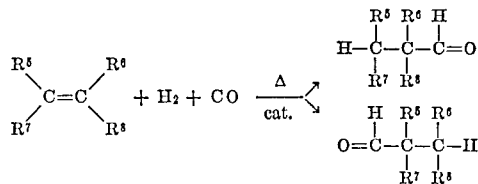

wherein $R^5$, $R^6$, $R^7$ and $R^8$ are defined as above.

Carboxylation is conducted by heating a mixture of carbon monoxide, water and any olefin in the presence of a catalytically effective amount of a catalyst as defined above for hydroformylation. This process may be particularly expressed by the equation:

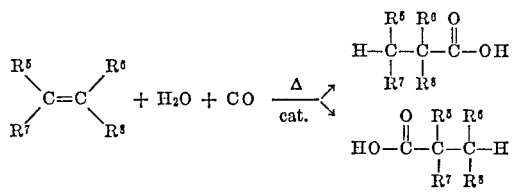

wherein $R^5$, $R^6$, $R^7$, and $R^8$ are defined as above.

Alkoxycarbonylation is conducted by heating a mixture of carbon monoxide, a mono- or dihydric aliphatic alcohol and any olefin in the presence of a catalytically effective amount of a catalyst as defined above for hydroformylation. This process may be particularly expressed by the equation(s):

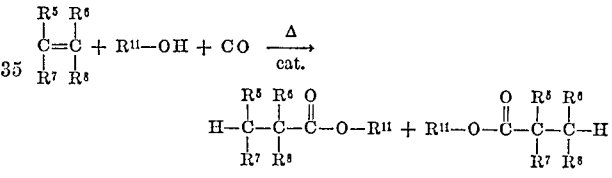

or, with a dihydric alcohol,

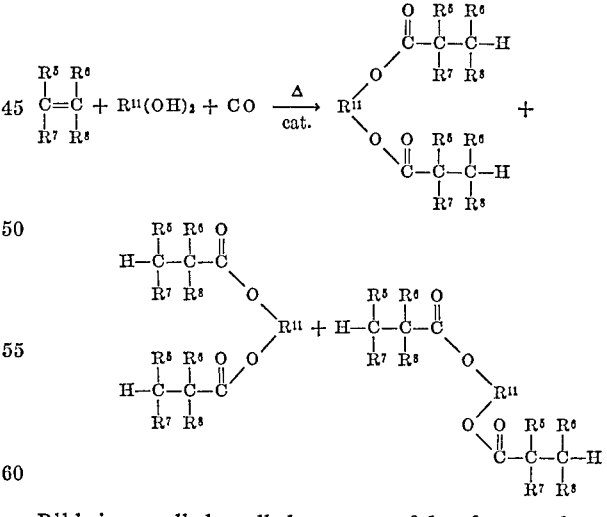

$R^{11}$ being an alkyl or alkylene group of 6 or fewer carbons and the other R's being as before.

(C) Products

The hydrogenated, isomerized or carbonylated products are, in general, known chemicals. They can be isolated by known methods, e.g., by distillation of the reaction mixture. Alternatively, the crude reaction mixture can be isolated by first washing with water followed by separating of the hydrocarbon layer from the water layer. Pure product is then obtained by distillation.

The compounds produced by the hydrogenation and/or isomerization of olefins are useful as solvents and as chemical intermediates, such as precursors of fiber-forming polyamides. For example, 1,5,9-cyclododecatriene can be hydrogenated to cyclododecene which can be oxidized with dilute potassium permanganate to dodecanedioic acid. Dodecanedioic acid reacts with diamines such as hexamethylenediamine to form a salt which can be heated under vacuum at a temperature of about 200° C. to form a fiber-forming polyamide. Fibers can be prepared from the polyamide by melt spinning.

The amines produced by the hydrogenation of nitriles are useful in the preparation of dyestuffs and as dispersing agents as shown for ethylamine; Turner, "The Condensed Chemical Dictionary," Reinhold Publications, New York, 1950, p. 271. The amines obtained are all primary amines and are also useful as acid scavengers.

The aldehydes produced in the carbonylation process are useful as solvents and as commercially important intermediates. For example, propionaldehyde is used in the production of polyvinyl acetals which are useful as adhesives and for the production of rubber chemicals. Turner, The Condensed Chemical Dictionary, Reinhold Publications, New York, 1950, p. 547.

The acids produced by the carbonylation of olefins in the presence of water are all useful for preparing the corresponding esters by reaction with alcohols. Esters, whether obtained from acids or by carbonylation of olefins in the presence of an alcohol, are useful as solvents and as plasticizers. Lower molecular weight esters, particularly those containing up to 10 carbon atoms, are useful as solvents and diluents in paints and varnishes. Higher molecular weight esters, particularly those containing 8 carbon atoms and more, are useful as plasticizers for polymers such as polyvinyl chloride, polymethyl methacrylate and polystyrene.

EMBODIMENTS OF THE INVENTION

The following examples, in which parts and percentages are by weight, illustrate the catalytic activity of the dispersions of the metal salts in tetraalkylammonium trihalostannate(II) and trihalogermanate(II) salts in the processes of the invention.

The preparation of the catalyst dispersions or solutions is in general obvious and described above. Examples 4 to 11 and 13 to 28 involve a procedure sometimes preferred for convenience. In this procedure, component A was first dissolved or dispersed in molten component B. The melt was then filtered to remove any undissolved or undispersed component A and the product allowed to solidify by cooling. It was then crushed so that the indicated amount of catalyst could be weighed out. In each example, the temperature specified for carrying out the reaction was high enough to insure that the previously prepared catalyst was molten during the process.

(A) Hydrogenation and isomerization:

EXAMPLE 1

Hydrogenation of ethylene

A mixture of 25 g. of tetraethylammonium trichlorostannate(II) and 0.3 g. of $PtCl_2$ was melted under vacuum to give a clear, dark-red solution. Hydrogen was added to a pressure of 380 mm. and ethylene was then added to bring the pressure to 760 mm. A moderately rapid pressure decrease occurred as the mixture was stirred at 95° C. After two hours, about 75% of the ethylene had had been hydrogenated to ethane. The infrared spectrum showed only absorption assignable to ethane and ethylene.

EXAMPLE 2

A solution of $PtCl_2$ in molten tetraethylammonium trichlorostannate(II) was stirred at 90° C. while an equimolar mixture of ethylene and hydrogen was bubbled in over a period of 3 hours at a rate of 4 ml. per minute. The gaseous products were collected in a glass trap maintained at $-196°$ C. The infrared spectrum of the gases which were collected showed the presence of roughly equal amounts of ethane and ethylene.

EXAMPLE 3

A mixture of 44 g. of tetra-n-butylammonium trichlorostannate(II) and 0.45 g. of $PtCl_2$ was melted under nitrogen in a glass pressure bottle. The $PtCl_2$ dissolved readily at 70° C. to give a bright-red syrup which could be cooled well below the melting point of the tetra-n-butylammonium-trichlorostannate(II) without solidification. The bottle was evacuated and pressured to 29 p.s.i.g. with a 1:1 mixture of ethylene and hydrogen. The mixture was stirred at 70° C. for 6 hours. Gas chromatographic analysis of the gaseous prouct showed ethane and ethylene in a ratio of about 6:1.

EXAMPLE 4

A mixture of 45 g. of a 1%, by weight, dispersion of platinum dichloride prepared in molten tetra-n-butylammonium trichlorostannate(II) and 17 g. of a 1%, by weight, dispersion of $PtCl_2$ in molten tetraethylammonium trichlorostannate(II) was melted in a glass pressure bottle under nitrogen. The bottle was cooled to 53° C. and pressured to 29 p.s.i.g. with an equimolar mixture of ethylene and hydrogen. The melt was stirred at 53° C. for 5 hours and was cooled to room temperature. Gas chromatography showed the gas to contain ethane and ethylene in a 2:3 ratio.

EXAMPLE 5

A solution of 0.05 g. of cis-dichlorobis(triethylphosphine)platinum prepared in 5.0 g. of molten tetraethylammonium trichlorostannate(II) was placed in a 25 ml. stirred glass hydrogenation reactor. The reactor was evacuated and was heated to 100° C. An equimolar mixture of hydrogen and ethylene was added to a pressure of 28 p.s.i.g. and the reactor was maintained at 100° C. for 22 hours. Gas chromatographic analysis showed that more than half the ethylene was converted to ethane.

A similar procedure was used in the following Examples 6 to 11, which also illustrate the use of molten salt solutions as catalysts for the hydrogenation of ethylene.

| Ex. | Catalyst* | Temp., °C. | Press, p.s.i.g. | Time, hrs. | Percent $C_2H_6$ (approx.) |
|---|---|---|---|---|---|
| 6 | $RhCl_3 \cdot xH_2O$ | 150 | 25 | 22 | 25 |
| 7 | $IrCl \cdot xH_2O$ | 150 | 25 | 3 | 15 |
| 8 | $PtCl_2$ | 100 | 24 | 6 | 50 |
| 9 | $cis(Et_3As)_2PtCl_2$ | 100 | 25 | 7 | 30 |
| 10 | $cis(Ph^{**}{}_3P)_2PtCl_2$ | 100 | 25 | 6.5 | 30 |
| 11 | $PtCl_2$ | 100 | 25 | 22 | 75 |

*In Examples 6-10, the solvent was tetraethylammonium trichlorostannate(II); in Example 11, tetraethylammonium trichlorogermanate(II).
**Ph is phenyl.

EXAMPLE 12

Hydrogenation of vinyl chloride

A mixture of 0.5 g. of platinum dichloride and 50 g. of tetraethylammonium trichlorostannate(II) was heated to 150° C. under vacuum and was pressured to 25 p.s.i.g. with an equimolar mixture of hydrogen and vinyl chloride. The pressure dropped to 21 p.s.i.g. over a period of 3 hours. Gas chromatographic analysis of the vapor phase showed extensive hydrogenation of the vinyl chloride to give a mixture of ethylene and ethane. (Contrast F. N. Jones, article and patent above.)

EXAMPLE 13

Hydrogenation of methyl linoleate

A mixture of 5.0 ml. of methyl linoleate and 50 g. of a 1% solution of platinum dichloride prepared in molten tetraethylammonium trichlorostannate(II) was agitated at 150° C. for 6 hours in a 80-ml. stainless steel tube under a hydrogen pressure of 100 atmospheres. The solid residue from the reaction vessel was distilled directly at 200° C. at 0.2 mm. to give 3 ml. of a cloudy liquid. The liquid was redistilled to give 2.0 g. of a clear, colorless liquid, $n_D^{26}$ 1.4522. (The Refractive Index is that expected for methyl oleate or one of its positional isomers.) The gas chromatogram of the product showed 62.8 area percent of a peak assignable to methyl oleate and 15.4 area percent of a peak assignable to an isomeric monoolefin.

EXAMPLE 14

Hydrogenation and isomerization of a diene

A mixture of 0.54 g. of 1,5-cyclooctadiene and 26 g. of a 1.1% dispersion of $PtCl_2$ in molten tetraethylammonium trichlorostannate(II) was stirred at about 100° C. under a pressure of 730 mm. of hydrogen for 17.3 hours. The liquid product was distilled from the molten solution. Gas chromatographic analysis of the distillate showed 0.6% cyclooctane, 2.6% cyclooctene, and 95.2% 1,3-cyclooctadiene. This result demonstrates the activity of the $PtCl_2$-tetraethylammonium trichlorostannate(II) solution as a catalyst for the isomerization and hydrogenation of 1,5-cyclooctadiene.

EXAMPLE 15

Hydrogenation and isomerization of a triene

A mixture of 5 ml. of cis-, trans-, trans-1,5,9-cyclododecatriene and 54 g. of a 1.1% dispersion of $PtCl_2$ prepared in molten tetraethylammonium trichlorostannate(II) was agitated in a metal reactor at 100° C. for 6 hours under a pressure of 100 atm. of hydrogen. The crude product was extracted with benzene and the benzene extract was distilled. After removal of the benzene, 3.23 g. of colorless liquid distilled at 58° C. at 1.1 mm. Gas chromatographic analysis of this liquid showed that about 15–20% reduction of the cyclododecatriene had occured. Of the reduced products, about 80% was a mixture of cis- and trans-cyclododecene and 15% was a mixture of cyclododecadienes. A small amount of cyclododecane was also obtained.

EXAMPLE 16

A mixture of 5.0 g. of 1,5,9-cyclododecatriene and 54 g. of a 1% dispersion of $PtCl_2$ in molten tetraethylammonium trichlorostannate (II) was agitated at 160° C. for 8 hours under a pressure of 100 atm. of hydrogen. The product was isolated by extraction as in Example 15. The gas chromatogram showed little unchanged cyclododecatriene and little or no cyclododecane. The main product (87%) was a mixture of cis- and trans-cyclododecene together with minor amounts of cyclododecadienes.

EXAMPLE 17

A mixture of 5.0 ml. of 1,5,9-cyclododecatriene and 46 g. of a 1% solution of $PtCl_2$ in molten tetraethylammonium trichlorostannate(II) was agitated at 140° C. for 6 hours under a pressure of 500 atm. of hydrogen. Isolation of the product as in Example 15 showed 73% of a mixture of cis- and trans-cyclodecene, 18% cyclododecadienes, 15% cyclododecatriene and 4% cyclododecane.

EXAMPLE 18

A mixture of 5.0 ml. of 1,5,9-cyclododecatriene and 50 g. of a 1% solution of platinum dichloride in molten tetraethylammonium trichlorostannate(II) was agitated at 140° C. for 6 hours under a pressure of 30 atm. of hydrogen. Isolation of the products as in Example 15 gave 2.3 g. of a mixture containing mostly cis-cyclododecene.

EXAMPLE 19

A mixture of 5.0 g. of trans-, trans-, trans-1,5,9-cyclododecatriene and 50 g. of a 1% dispersion of $PtCl_2$ in molten tetraethylammonium trichlorostannate(II) was agitated at 150° C. for 8 hours under a pressure of 100 atm. of hydrogen. Isolation of products as in Example 15 gave 4.13 g. of a liquid which contained mostly cis-cyclododecene and very little unchanged cyclododecatriene.

EXAMPLE 20

A mixture of 5.0 ml. of 1,5,9-cyclododecatriene and 38 g. of a 1% solution of platinum dichloride prepared in molten methyltriphenylphosphonium tribromostannate(II) was agitated at 150° C. for 6 hours in a 80-ml. Hastelloy® tube under a pressure of 100 atmospheres of hydrogen. The crude reaction mixture was extracted with benzene and the extract was distilled to give 2.87 g. of clear, colorless, high-boiling liquid. Gas chromatographic analysis indicated complete conversion of the triene to a mixture containing 18% cyclododecane and 64% cyclodecene.

EXAMPLE 21

A mixture of 5.0 ml. of cis, trans, trans-1,5,9-cyclododecatriene and a solution of 0.5 g. of cis-dichlorobis(triethylarsine)platinum prepared in 50 g. of molten tetraethylammonium trichlorostannate(II) was agitated at 150° C. for 10 hours in a 80-ml. stainless steel tube under a hydrogen pressure of 100 atmospheres. The products were extracted with benzene. Distillation of the extract gave 2.9 g. of clear, colorless liquid which distilled at 59–61° C. at 0.3 mm.; $n_D^{26}$ 1.5059. The gas chromatogram indicated hydrogenation to give cyclododecene in addition to extensive isomerization of the starting triene to the all transisomer.

When the olefins shown in Table I are substituted for ethylene in the hydrogenation procedures of Examples 1–11, the compounds shown as hydrogenation products are the principal products obtained.

TABLE I

| Item | Olefin | Hydrogenation product(s) |
|---|---|---|
| 1 | 1-Octene | Octane. |
| 2 | 1-tetradecene | Tetradecane. |
| 3 | 1,5-Hexadiene | 1-hexene and hexane. |
| 4 | 1,11-Dodecadiene | 1-dodecene and dodecane. |
| 5 | 1,13-Tetradecadiene | 1-tetradecene and tetradecane. |
| 6 | Styrene | Ethylbenzene. |
| 7 | Stilbene | 1,2-diphenylethane. |
| 8 | α-Vinylnaphthalene | α-Ethylnaphthalene. |
| 9 | 4-phenyl-1-butene | n-Butylbenzene. |
| 10 | 3-phenylcyclobutylethylene | 1-ethyl-3-phenylcyclobutane. |
| 11 | 2,3,5,6-tetramethylstyrene | 1-ethyl-2,3,5,6-tetramethylbenzene. |
| 12 | 4,4'-dimethylstilbene | 1,2-(p-tolyl)ethane. |
| 13 | 5-phenylpiperylene | 1-phenyl-2-pentene and n-pentylbenzene. |
| 14 | 5-p-tolylpiperylene | 1-(p-tolyl)-2-pentene and p-pentyltoluene. |
| 15 | Ethyl 5-octenoate | Ethyl octoate. |
| 16 | Amyl undecylenate | Amyl undecanoate. |
| 17 | Methyl sorbate | Methyl 2-hexenoate and methyl hexanoate. |
| 18 | Propyl linoleate | Propyl oleate and propyl octadecanoate. |
| 19 | Methyl acrylate | Methyl propionate. |
| 20 | Ethyl 2-nonenoate | Ethyl nonanoate. |
| 21 | Ethyl vinyl ketone | Diethyl ketone. |
| 22 | Isopropenyl methyl ketone | Isopropyl methyl ketone. |

EXAMPLE 22

Hydrogenation of a nitrile

A mixture of 5.0 ml. of acetonitrile and a solution of 0.5 g. of platinum dichloride prepared in molten tetraethylammonium trichlorostannate(II) was agitated at 150° C. for 8 hours in an 80-ml. stainless steel tube under a hydrogen pressure of 100 atmospheres. The crude reaction product was extracted with benzene. Gas chromatographic analysis of the extract showed the presence of ethylamine in addition to unchanged acetonitrile.

The following examples were carried out as described in Example 22:

| Example | Metal halide | Temp./pressure | Result |
|---|---|---|---|
| 23 | $IrCl_3 \cdot 3H_2O$ | 150° C./160 atm | $C_2H_5NH_2$ formed. |
| 24 | $RhCl_3 \cdot 3H_2O$ | 150° C./160 atm | $C_2H_5NH_2$ formed. |

When the nitriles shown in Table II are substituted for acetonitrile in the procedures of Examples 22–24, the indicated amines are the principal products obtained.

TABLE II

| Item | Nitrile | Amine |
|---|---|---|
| 1 | Acetonitrile | Ethylamine. |
| 2 | Propionitrile | Propylamine. |
| 3 | Isobutyronitrile | Isobutylamine. |
| 4 | Lauronitrile | Laurylamine. |
| 5 | Stearonitrile | Stearylamine. |
| 6 | Cyclopropanecarbonitrile | (Cyclopropylmethyl)amine. |
| 7 | Cyclopentanecarbonitrile | (Cyclopentylmethyl)amine. |
| 8 | Cyclohexanecarbonitrile | (Cyclohexylmethyl)amine. |
| 9 | Dicyclopentylacetonitrile | (2,2-dicyclopentylethyl)amine. |
| 10 | Benzonitrile | Benzylamine. |
| 11 | p-Tolunitrile | p-Methylbenzylamine. |
| 12 | 1-phenylcyclopropanecarbonitrile | (1-phenylcyclopropylmethyl)amine. |
| 13 | α-Naphthonitrile | α-Naphthylmethylamine. |
| 14 | 1-phenanthrenecarbonitrile | 1-phenanthrylmethylamine. |
| 15 | β,β,β-Triphenylpropionitrile | 3,3,3-triphenylpropylamine |
| 16 | Malononitrile | 1,3-propylenediamine. |
| 17 | Succinonitrile | 1,4-butylenediamine. |
| 18 | Adiponitrile | Hexamethylenediamine. |
| 19 | Phthalonitrile | o-Xylene-α,α′-diamine. |
| 20 | Sebaconitrile | Decamethylenediamine. |
| 21 | Biphenyl-4,4′-dicarbonitrile | 4,4′-bibenzylamine. |

(B) Carbonylation:

EXAMPLE 25

Hydroformylation of ethylene

A dispersion of 0.6 g. of platinum dichloride prepared in 51 g. of molten tetraethylammonium trichlorostannate(II) was placed in a glass-lined 400 ml. pressure vessel. The vessel was pressured to 1000 atm. with a 1:2:10 mixture of hydrogen, ethylene, and carbon monoxide and was agitated at 90° C. for 6 hours. The volatile products were fractionated by vacuum distillation. The product retained by a trap cooled to −119° C. was propionaldehyde. Treatment with 2,4-dinitrophenylhydrazine gave a yellow-orange product. Recrystallization from ethanol gave orange needles of the 2,4-dinitrophenylhydrazone of propionaldehyde, melting point 154–156° C. A mixture melting point with an authentic sample was not depressed. Vacuum distillation of the residual liquid clinging to the frozen salt in the pressure vessel gave 2.8 g. of clear colorless liquid. Gas chromatographic analysis showed the presence of propionaldehyde and 2-methyl-2-pentenal.

EXAMPLE 26

A dispersion of 0.5 g. of $Na_3RhCl_6$ prepared in 39.3 g. of molten tetraethylammonium trichlorostannate(II) was heated in a glass-lined pressure vessel at 90° C. for 6 hours under a pressure of 1000 atm. of a 1:2:10 mixture of hydrogen, ethylene, and carbon monoxide. Vacuum distillation of the volatile products showed the presence of propionaldehyde which was identified by its infrared spectrum and gas chromatography.

When the olefins shown in Table III are substituted for ethylene in the procedures of Examples 25–26, the compounds shown as aldehyde products are among the principal products obtained.

TABLE III

| Item | Olefin | Aldehyde(s) |
|---|---|---|
| 1 | 2-butene | 2-methylbutyraldehyde. |
| 2 | 1-octene | Nonanal and 2-methyloctanal. |
| 3 | 1-tetradecene | Pentadecanal and 2-methyltetradecanal. |
| 4 | 1,5-hexadiene | 6-heptenal and 2-methyl-5-hexenal. |
| 5 | 1,11-dodecadiene | 12-tridecanal and 2-methyl-11-dodecanal. |
| 6 | 1,13-tetradecadiene | 14-pentadecenal and 2-methyl-13-tetradecenal. |
| 7 | Styrene | 2-phenylpropionaldehyde and 3-phenylpropionaldehyde. |
| 8 | Stilbene | 2,3-diphenylpropionaldehyde. |
| 9 | α-vinylnaphthalene | 2-(α-naphthyl)propionaldehyde and 3-(α-naphthyl)propionaldehyde. |
| 10 | 4-phenyl-1-butene | 5-phenylpentanal and 2-methyl-4-phenylbutanal. |
| 11 | 3-phenylcyclobutylethylene | 3-(3-phenylcyclobutyl)propional and 2-(3-phenylcyclobutyl)propional. |
| 12 | 2,3,5,6-tetramethylstyrene | 2-durylpropional and 3-durylpropional. |
| 13 | 4,4′-dimethylstilbene | 2,3-di(p-tolyl)propional. |
| 14 | 5-phenylpiperylene | 6-phenyl-3-hexenal and 4-phenyl-2-vinylbutanal. |
| 15 | 5-p-tolylpiperylene | 6-(p-tolyl)-3-hexenal and 4-(p-tolyl)-2-vinylbutanal. |
| 16 | Ethyl 6-octenoate | Ethyl 7-formyloctanoate and ethyl 6-formyloctanoate. |
| 17 | Amyl undecylenate | Amyl 11-formylundecanoate and amyl 10-formylundecanoate. |
| 18 | Methyl sorbate | Methyl 5-formyl-2-hexenoate and methyl 3-formyl-4-hexenoate. |
| 19 | Propyl linoleate | Propyl 13-formyloleate and propyl 12-formyloleate. |
| 20 | Methyl acrylate | Methyl 3-formylpropionate. |
| 21 | Ethyl 2-nonenoate | Ethyl 3-formylnonanoate. |
| 22 | Ethyl vinyl ketone | 4-oxohexanal. |
| 23 | Isopropenyl methyl ketone | 3-methyl-4-oxopentanal. |

EXAMPLE 27

Carboxylation of 1-hexene

A mixture of 5.0 g. of 1-hexene, 1.4 ml. of water and 25 g. of a 1% solution of platinum dichloride in tetraethylammonium trichlorostannate(II) was shaken at 90° C. for 6 hours under 400 atmospheres carbon monoxide pressure in an 80-ml. stainless steel tube. The gases were vented. The residual solid was crushed and extracted with ether. Evaporation of the ether extract gave ca. 2 ml. of a mixture of heptanoic acid and 2-methylhexanoic acid in a ratio of about 3:1 as determined by esterification and gas chromatographic analysis.

When the olefins shown in Table IV are substituted for 1-hexene in the procedure of Example 27, the indicated acid products are the principal products obtained.

TABLE IV

| Item | Olefin | Acid(s) |
|---|---|---|
| 1 | Cyclohexene | Cyclohexanecarboxylic acid. |
| 2 | 1-octene | Nonanoic acid and 2-methyloctanoic acid. |
| 3 | Propylene | Butyric acid and isobutyric acid. |
| 4 | Isobutylene | Isovaleric acid and pivalic acid. |
| 5 | Ethylene | Propionic acid. |
| 6 | 1-Tetradecene | Pentadecanoic acid and 2-methyltetradecanoic acid. |
| 7 | 1,13-tetradecadiene | 14-pentadecenoic acid and 2-methyl-13-tetradecenoic acid. |
| 8 | Styrene | 3-phenylpropionic acid and 2-phenylpropionic acid. |
| 9 | Stilbene | 2,3-diphenylpropionic acid. |
| 10 | α-Vinylnaphthalene | 3-(α-naphthyl)propionic acid and 2-(α-naphthyl)propionic acid. |
| 11 | 4-phenyl-1-butene | 5-phenylvaleric acid and 2-methyl-4-phenylbutyric acid. |
| 12 | 3-phenylcyclobutylethylene | 3-(3-phenylcyclobutyl)propionic acid and 2-(3-phenylcyclobutyl)propionic acid. |
| 13 | 2,3,5,6-tetramethylstyrene | 2-durylpropionic acid and 3-durylpropionic acid. |
| 14 | 4,4'-dimethylstilbene | 2,3-di(p-tolyl)propionic acid. |
| 15 | 5-phenylpiperylene | 6-phenyl-4-hexenoic acid and 4-phenyl-2-vinylbutyric acid. |
| 16 | 5-p-tolylpiperylene | 6-(p-tolyl)-4-hexenoic acid and 4-(p-tolyl)-2-vinylbutyric acid. |
| 17 | Ethyl 6-octenoate | 2-methyloctanedioic acid, monoethyl ester; and 2-ethylheptanedioic acid, monoethyl ester. |
| 18 | Amyl undecylerate | Dodecanedioic acid, monoamyl ester; and 2-methylundecanedioic acid, monoamyl ester. |
| 19 | Methyl sorbate | 5-methyl-2-hexenedioic acid, monomethyl ester; and 2-propenylsuccinic acid, monomethyl ester. |
| 20 | Propyl linoleate | 2-pentyl-5-tetradecenedioic acid, monopropyl ester; and 2-hexyl-4-tridecenedioic acid, monopropyl ester. |
| 21 | Methyl acrylate | Succinic acid, monomethyl ester. |
| 22 | Ethyl 2-nonenoate | 2-hexylsuffinic acid, monoethyl ester. |
| 23 | Ethyl vinyl ketone | 4-oxohexanoic acid. |
| 24 | Isopropenyl methyl ketone | 3-methyl-4-oxovaleric acid. |

EXAMPLE 28

Alkoxycarbonylation of 1-hexene

A mixture of 8.4 g. of 1-hexene, 4.8 g. of methanol, and 45 g. of a 1% solution of platinum dichloride prepared in molten tetraethylammonium trichlorostannate(II) was agitated at 90° C. for 6 hours in a 400-ml. glass-lined shaker tube under a carbon monoxide pressure of 450 atmospheres. Gas chromatographic analysis of the undistilled liquid product showed an approximate 15% yield of a mixture of methyl heptanoate and methyl 2-methylhexanoate. The ratio of linear isomer to branched isomer was 4:1.

When the alcohols and olefins shown in Table V are substituted respectively for methanol and 1-hexene in the procedure of Example 28, the indicated ester products are among the principal products obtained.

Since obvious modifications and equivalents will be evident to those skilled in the chemical arts, I propose to be bound solely by the appended claims.

The embodiments of the invention in which an exclusive property or privilege is claimed are defined as follows:

1. The hydrogenation process which comprises: contacting hydrogen and an olefin
    with
        a catalytically effective amount of
        a dispersion at a temperature between about 10° and 350° C. and above its melting point, said dispersion consisting essentially of:
            (A) at least 0.05 weight percent of a chloride-, bromide- or iodide-containing salt of a metal having an atomic number of 22–28, 40–46, or 72–79; and

TABLE V

| Item | Alcohol | Olefin | Ester(s) |
|---|---|---|---|
| 1 | Methanol | Cyclohexene | Methyl cyclohexanecarboxylate. |
| 2 | Ethanol | 1-octene | Ethyl nonanoate and ethyl 2-methyloctanoate. |
| 3 | Propanol | Propylene | Propyl butyrate and propyl isobutyrate. |
| 4 | Butanol | Isobutylene | Butyl isovalerate and butyl pivalate. |
| 5 | Isobutanol | do | Isobutyl isovalerate and isobutyl pivalate. |
| 6 | tert-Butanol | 1-butene | tert-Butyl valerate and tert-butyl 2-methylbutyrate. |
| 7 | Pentanol | Propylene | Pentyl butyrate and pentyl isobutyrate. |
| 8 | Hexanol | 1-hexene | Hexyl heptanoate and hexyl 2-methylhexanoate. |
| 9 | Ethylene glycol | Ethylene | Ethylene propionate. |
| 10 | 1,2-propylene glycol | Propylene | Methylethylene butyrate and methylethylene isobutyrate. |
| 11 | 1,4-butane diol | Ethylene | 1,4-butylene propionate. |
| 12 | 1,5-pentanediol | 1-butene | 1,5-pentylene valerate, 1,5-pentylene 2-methylbutyrate and 1,5-pentylene 2-methylbutyrate valerate. |
| 13 | 1,3-hexanediol | Propylene | 3-propylpropylene butyrate, 3-propylpropylene isobutyrate and 3-propylpropylene butyrate isobutyrate. |
| 14 | 1,6-hexanediol | Ethylene | 1,6-hexylene propionate. |
| 15 | Ethanol | Ethyl acrylate | Diethyl succinate. |
| 16 | Methanol | Methyl undecylenate | Dimethyl dodecanedioate and dimethyl 2-methylundecanedioate. |
| 17 | do | 1-tetradecene | Mesyl pentadecanoate and methyl 2-methyltetradecanoate. |
| 18 | do | 1,13-tetradecadiene | Methyl 14-pentadecenoate and methyl 2-methyl-13-tetradecenoate. |
| 19 | Ethanol | Styrene | Ethyl 2-phenylpropionate and ethyl 3-phenylpropionate. |
| 20 | do | Stilbene | Ethyl 2,3-diphenylpropionate. |
| 21 | Methanol | α-Vinylnaphthalene | Methyl 2-(α-naphthyl)propionate and methyl 3-(α-naphthyl)propionate. |
| 22 | do | 4-phenyl-1-butene | Methyl 5-phenylvalerate and methyl 2-methyl-4-phenylbutyrate. |
| 23 | do | 3-phenylcyclobutylethylene | Methyl 3-(3-phenylcyclobutyl)propionate and methyl 2-(3-phenylcyclobutyl)propionate. |
| 24 | Ethanol | 2,3,5,6-tetramethylstyrene | Ethyl 2-durylpropionate and ethyl 3-durylpropionate. |
| 25 | Methanol | 4,4'-dimethylstilbene | Methyl 2,3-di(p-tolyl)propionate. |
| 26 | Ethanol | 5-phenylpiperylene | Ethyl 6-phenyl-4-hexenoate and ethyl 4-phenyl-2-vinylbutanoate. |
| 27 | do | 5-p-tolylpiperylene | Ethyl 6-(p-tolyl)-4-hexenoate and ethyl 4-(p-tolyl)-2-vinylbutanoate. |
| 28 | do | Ethyl 6-octenoate | Diethyl 2-methyloctanedioate and diethyl 2-ethylheptanedioate. |
| 29 | Amyl alcohol | Amyl undecylenate | Diamyl dodecanedioate and diamyl 2-methylundecanedioate. |
| 30 | Methanol | Methyl sorbate | Dimethyl 5-methyl-2-hexenedioate and dimethyl 2-propenylsuccinate. |
| 31 | Propanol | Propyl linoleate | Dipropyl 2-pentyl-5-tetradecenedioate and dipropyl 2-hexyl-4-tridecenedioate. |
| 32 | Methanol | Methyl acrylate | Dimethyl succinate. |
| 33 | Ethanol | Ethyl 2-nonenoate | Diethyl 2-hexylsuccinate. |
| 34 | Methanol | Ethyl vinyl ketone | Methyl 4-oxohexanoate. |
| 35 | do | Isopropenyl methyl ketone | Methyl 3-methyl-4-oxovalerate. |

(B) a molten salt of the formula
$$[R^1R^2R^3R^4Q]YX_3$$
wherein $R^1$, $R^2$, $R^3$ and $R^4$, independently, contain up to 18 carbons and are alkyl, cycloalkyl, aryl, alkaryl, or aralkyl; or $R^1$ and $R^2$, conjointly, contains 4 to 6 carbons and is alkylene; or $R^1$, $R^2$, $R^3$ and Q conjointly is pyridinium or quinolinium;

Q is nitrogen or phosphorus;

Y is tin or germanium and

X is chlorine or bromine.

2. The process of claim 1 accomplished in the presence of platinum dichloride dispersed in tetraethylammonium trichlorostannate(II).

3. The process of claim 1 accomplished in the presence of platinum dichloride dispersed in tetra-n-butylammonium trichlorostannate(II).

4. The process of claim 1 accomplished in the presence of cis-dichlorobis(triethylphosphine)platinum dispersed in tetraethylammonium trichlorostannate(II).

5. The process of claim 1 accomplished in the presence of platinum dichloride dispersed in tetraethylammonium trichlorogermanate(II).

6. The process of claim 1 wherein ethylene is hydrogenated.

7. The process of claim 1 wherein vinyl chloride is hydrogenated.

8. The process of claim 1 wherein hydrogenation is accompanied by isomerization.

9. The process of claim 8 wherein 1,5-cyclooctadiene and hydrogen are reacted.

10. The process of claim 8 wherein 1,5,9-cyclododecatriene and hydrogen are reacted.

References Cited

UNITED STATES PATENTS

| | | | |
|---|---|---|---|
| 3,022,359 | 2/1962 | Wiese | 260—666 A |
| 3,102,899 | 9/1963 | Cannell | 260—439 |
| 3,251,892 | 5/1966 | Seefelder et al. | 260—666 A |
| 3,387,045 | 6/1968 | Zuech | 260—666 A |
| 3,428,661 | 2/1969 | Taylor | 260—429 |
| 3,458,547 | 7/1969 | Coffey | 260—429 |
| 3,463,830 | 8/1969 | Dunning et al. | 260—683.9 |
| 3,471,581 | 10/1969 | Maxfield | 260—666 A |
| 3,485,887 | 12/1969 | Kronig et al. | 260—677 H |
| 3,507,928 | 4/1970 | Rinehart | 260—666 A |
| 3,531,530 | 9/1970 | Torre et al. | 260—598 |

OTHER REFERENCES

Richard Cramer, Accounts of Chemical Research, vol. 1, No. 6, June 1968, published by ACS, pp. 186–191.

DELBERT E. GANTZ, Primary Examiner

V. O'KEEFE, Assistant Examiner

U.S. Cl. X.R.

260—497, 533, 583 K, 604, 676, 677 H, 680, 683.9